(12) United States Patent
Slater et al.

(10) Patent No.: US 8,317,249 B2
(45) Date of Patent: Nov. 27, 2012

(54) COMBINATION LOAD BED AND PLATFORM FOR A VEHICLE

(76) Inventors: Robert William Slater, Lot et Garonne (FR); Stephen Render, Hilton (GB)

(*) Notice: Subject to any disclaimer, the term of this patent is extended or adjusted under 35 U.S.C. 154(b) by 0 days.

(21) Appl. No.: 12/532,897

(22) PCT Filed: Mar. 20, 2008

(86) PCT No.: PCT/GB2008/001088
§ 371 (c)(1),
(2), (4) Date: Feb. 4, 2010

(87) PCT Pub. No.: WO2008/117065
PCT Pub. Date: Oct. 2, 2008

(65) Prior Publication Data
US 2010/0133874 A1      Jun. 3, 2010

(30) Foreign Application Priority Data

Mar. 24, 2007 (GB) .................................. 0705687.2

(51) Int. Cl.
*B62D 25/22* (2006.01)
(52) U.S. Cl. ............... 296/26.01; 296/26.03; 296/26.12; 296/26.13; 296/26.15
(58) Field of Classification Search ........... 296/3, 26.01, 296/26.03, 26.08–26.15, 182.1, 184.1, 186.1–186.5, 296/37.5, 37.6; 180/166
See application file for complete search history.

(56) References Cited

U.S. PATENT DOCUMENTS

| | | | | |
|---|---|---|---|---|
| 1,327,248 A * | 1/1920 | Moody | ............................ | 296/21 |
| 2,278,450 A * | 4/1942 | Jones | ......................... | 296/24.33 |
| 3,462,170 A * | 8/1969 | Smith et al. | .................... | 280/166 |
| 3,912,298 A * | 10/1975 | Humphrey | .................... | 280/166 |
| 3,997,211 A * | 12/1976 | Graves | .......................... | 296/162 |
| 4,188,057 A * | 2/1980 | Pauli | .............................. | 296/162 |
| 4,613,155 A * | 9/1986 | Greenwood | ................... | 280/760 |
| 4,720,116 A * | 1/1988 | Williams et al. | ............... | 280/166 |
| 4,874,197 A * | 10/1989 | Grable | ........................... | 296/162 |
| 5,799,962 A * | 9/1998 | Barnhart | ........................ | 280/166 |
| 5,997,067 A * | 12/1999 | Shambeau et al. | ............ | 296/57.1 |
| 6,068,277 A * | 5/2000 | Magnussen | ..................... | 280/166 |
| 6,120,235 A * | 9/2000 | Humphries et al. | ........... | 414/563 |
| 6,431,093 B1 * | 8/2002 | Hansen | ........................... | 108/135 |
| 6,601,896 B1 * | 8/2003 | Nye et al. | .................... | 296/26.13 |

(Continued)

FOREIGN PATENT DOCUMENTS

CA          2410135          9/2004

(Continued)

*Primary Examiner* — Glenn Dayoan
*Assistant Examiner* — Gregory Blankenship
(74) *Attorney, Agent, or Firm* — Pedersen and Company, PLLC; Ken J. Pedersen; Barbara S. Pedersen

(57) ABSTRACT

This invention relates to load bed for a vehicle, and in particular to a load bed adapted to carry elongate articles upon the public roads. The load bed could for example be the trailer of an articulated vehicle, or it could be part of a rigid truck, as desired. The load bed (214) has a set of retaining posts along the longitudinal sides of the bed, and at least one platform (224) is mounted upon the load bed and is movable between a stowed condition and an in use condition, the retaining posts being between the load bed and the platform in its in use condition.

9 Claims, 6 Drawing Sheets

U.S. PATENT DOCUMENTS

| | | | | |
|---|---|---|---|---|
| 6,964,444 | B2* | 11/2005 | Chumley et al. | 296/26.08 |
| 7,222,905 | B2* | 5/2007 | Jaeck | 296/1.07 |
| 7,410,031 | B2* | 8/2008 | Jensen | 182/127 |
| 7,591,497 | B2* | 9/2009 | Johns | 296/3 |
| 7,621,587 | B1* | 11/2009 | Hanser et al. | 296/156 |
| 7,628,439 | B1* | 12/2009 | Strong | 296/26.03 |
| 7,631,916 | B1* | 12/2009 | Coleman | 296/3 |
| 7,841,645 | B2* | 11/2010 | Diamond et al. | 296/165 |
| 2001/0052712 | A1* | 12/2001 | Fukushima et al. | 296/3 |
| 2005/0067849 | A1* | 3/2005 | Walkden | 296/26.15 |
| 2007/0075557 | A1* | 4/2007 | Frieder et al. | 296/3 |
| 2007/0222247 | A1* | 9/2007 | Jaeck | 296/26.02 |
| 2008/0296922 | A1* | 12/2008 | Diamond et al. | 296/26.13 |

FOREIGN PATENT DOCUMENTS

FR      2750089      12/1997

\* cited by examiner

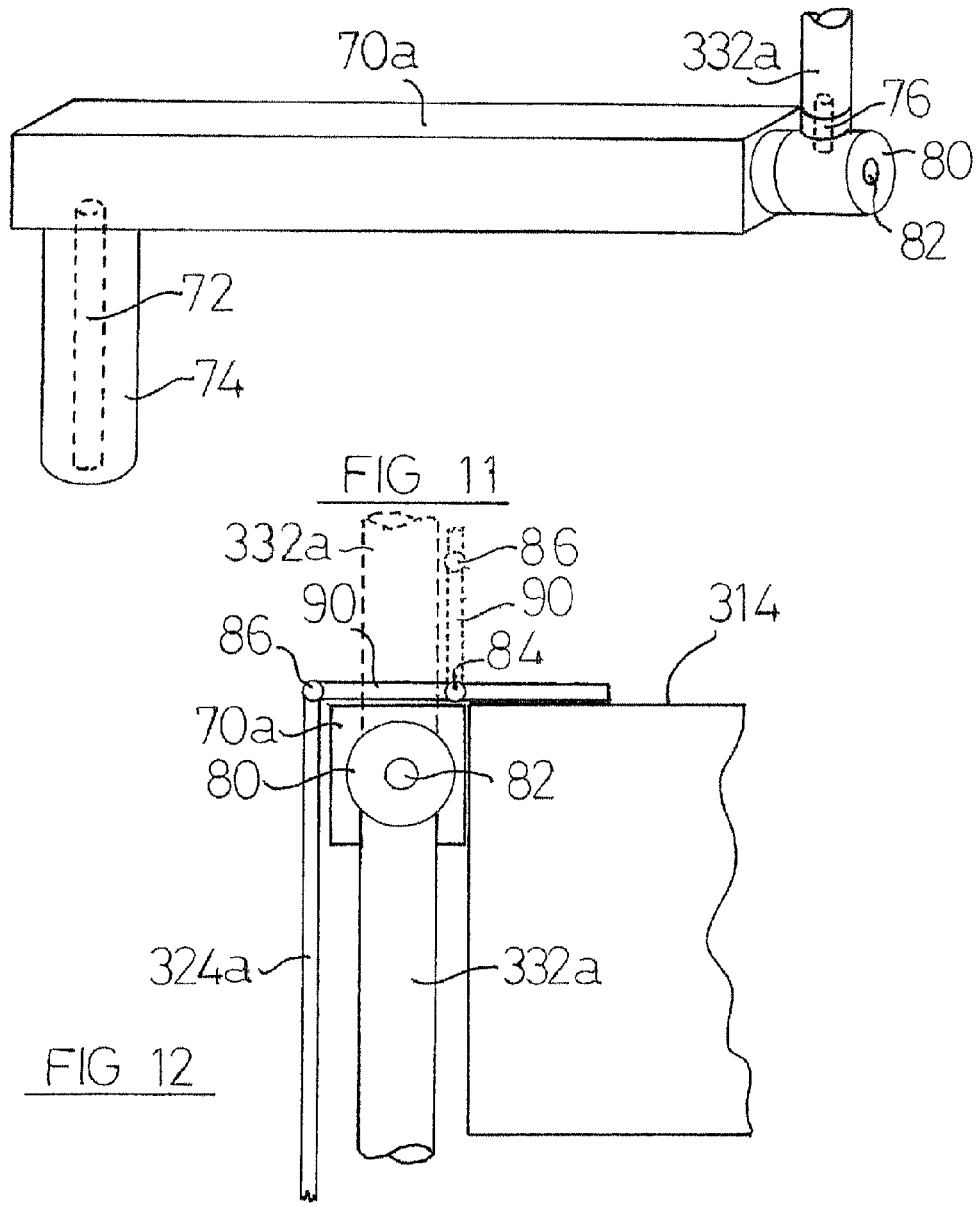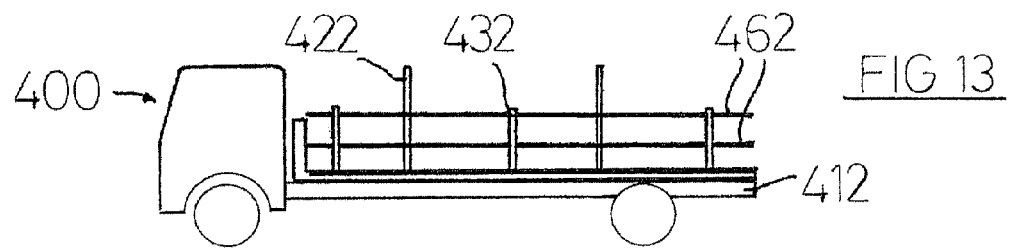

COMBINATION LOAD BED AND PLATFORM FOR A VEHICLE

FIELD OF THE INVENTION

This invention relates to a combination load bed and platform for a vehicle, and in particular to a vehicle adapted to transport articles upon the public roads. The vehicle could for example be a trailer designed for connection to a tractor unit, the tractor unit and trailer together forming an articulated vehicle, or it could be a rigid truck, as desired.

The invention is expected to find its greatest utility with vehicles adapted to carry elongate articles, and much of the following description therefore relates to such applications. The invention is not, however, limited to such applications.

In the following description, directional and orientational terms such as "top", "beneath", "front" etc. refer to the vehicle in its normal orientation of use, with the front of the load bed (to which the tractor unit for that embodiment will be connected) being to the right in FIGS. 9 and 10.

BACKGROUND OF THE INVENTION

The load beds of vehicles are used to transport a large variety of goods around the road network. Some of those goods comprise elongate articles such as pile cages for reinforcing concrete piles, tree trunks, underground pipes and the like. It is a feature of these elongate articles that they must be lifted onto and off from the load bed by crane, i.e. it is not normally possible to use a fork lift truck to lift such articles as is the case with palletised articles for example. The load bed is usually fitted with a retaining structure, typically comprising a set of removable or permanent retaining posts at selected intervals along each of the longitudinal sides of the load bed in order to prevent the elongate articles from rolling or sliding off the side of the load bed, and the crane must lift the articles over the top of the retaining posts.

Because of the requirement to use a crane, it is necessary that an operator stand upon or close to the load bed so as to disconnect the lifting cables when an article has been lifted onto the load bed, and subsequently to connect the lifting cables when that article is to be lifted off the load bed.

In order to disconnect or connect lifting cables to the uppermost elongate articles, the operator may stand upon the stack of articles, and if so he or she will usually be standing over two meters above the ground. It will be understood that the loading and unloading of elongate articles in this way represents a significant health and safety hazard to the operator.

The operator could of course climb down from the load bed whilst each elongate article is loaded or unloaded, but climbing on to and off from a load bed is itself a difficult procedure not without danger, and so typically the operator will seek to is balance upon the stack of articles upon the load bed whilst other articles are loaded or unloaded.

DESCRIPTION OF THE PRIOR ART

In order to reduce the danger involved, some facilities at which elongate articles are loaded onto or unloaded from a vehicle utilise an inflatable mattress around the load bed. If the operator falls from the load bed the mattress will soften his or her landing and hopefully prevent operator injury. However, inflating and subsequently deflating the mattress is a time consuming task, and this adds considerably to the overall cost of transportation of the articles. Also, the operator may nevertheless be injured as a result of falling from the load bed onto the mattress.

Other facilities utilise a purpose-built platform standing upon the ground, and upon which the operator can stand during disconnection and connection of the lifting cables, the platform being around the same height as the load bed. The platform is usually substantially the same length as the load bed, so that the operator can walk along the platform so as to disconnect (or connect, as appropriate) the lifting cables connected adjacent to the opposed ends of the elongate articles. A first disadvantage of such a platform is the time and cost of building it, resulting in its use normally only at facilities where a large number of loads of elongate articles are to be loaded or unloaded—it is not always cost-effective to build a platform at a temporary site where elongate articles may be loaded or unloaded (the temporary site may for example be a forest where several trees have been felled and are loaded onto a trailer, or a construction site where a number of pile cages are required). Also, on a construction site for example the unloading bay can be moved as the construction progresses, and the location can change without much warning, leaving little or no time to strip down and re-build the platform at the new unloading bay. There is also a cost penalty associated with stripping-down and re-building the platform. A second disadvantage is that the driver must park the vehicle so that the load bed is adjacent to the platform, and it requires considerable skill to park sufficiently close to the platform so that the operator cannot fall between the platform and the load bed, and yet avoid colliding with and damaging the platform.

Because of the disadvantages of the above systems, many facilities do not utilise either an inflatable mattress or a purpose-built platform.

A different method of seeking to reduce the danger is to provide a balustrade upon the load bed itself, i.e. one or more rails mounted upon posts at a chosen height above the load bed. The balustrade reduces the likelihood that an operator will fall off the load bed, but is only effective if the operator is standing upon the load bed, or upon the stack of articles loaded thereupon, and it is not always desirable to have the operator standing upon the bed or stack. In addition, if an elongate article should unexpectedly swing as it is suspended from the crane, or should otherwise move during loading or unloading of the articles, the balustrade may hinder or prevent the operator from escaping from the load bed, and may instead cause the operator to become trapped between the elongate article and the balustrade. Once again therefore, this method is only seldom employed because of the remaining danger.

SUMMARY OF THE INVENTION

The inventors have therefore realised that a better method of seeking to reduce or avoid the dangers involved in loading and unloading elongate articles is required, and in particular a better method to reduce or avoid the dangers to the operator when disconnecting and connecting lifting cables to the elongate articles.

According to the invention there is provided a combination load bed and platform for a vehicle, the load bed having a longitudinal axis and two longitudinal sides, the vehicle being adapted for transporting articles on the load bed, the load bed in use having a retaining structure along at least one of the longitudinal sides, the platform being mounted upon the vehicle for movement between a stowed condition and an in use condition, at least part of the retaining structure being between the load bed and the platform when the platform is in its in use condition.

Accordingly, a purpose-built platform does not need to be built at the site where the articles are either loaded or unloaded. Because the platform is mounted upon the vehicle its position in relation to the load bed can be predetermined, and does not rely upon the skill or accuracy of the driver.

The vehicle will preferably be adapted for transporting elongate articles, in which case the elongate articles will be positioned upon the load bed with their respective longitudinal axes substantially aligned with the longitudinal axis of the load bed.

Preferably, the platform in its stowed condition does not project significantly beyond the width of the load bed. A load bed according to the present invention therefore need not be significantly wider than a conventional load bed when the platform is in its stowed condition, and in particular can be designed to meet the maximum vehicle width determined for the roads of the location of use.

The platform can be designed to pivot between its in use and stowed conditions, or it can be designed to slide between these conditions. The platform can be substantially parallel with, or substantially perpendicular to, the surface of the load bed in its stowed condition. Part or all of the platform may be located beneath the load bed in its stowed condition.

In one embodiment, the platform in its stowed condition is located in a channel or tray underneath the load bed, the platform being slidable relative to the channel—in the in use condition the platform is extended to project from the channel.

Movement of the platform between its in use and stowed conditions can be hydraulically actuated, pneumatically actuated, electrically actuated, or manually actuated, as desired, it being understood that a load-carrying vehicle will typically have hydraulic, pneumatic and/or electrical power provided for other purposes, which power which can also be used to move the platform.

Desirably, the platform runs substantially the full length of the load bed, and is therefore in the form of a gantry or walkway mounted alongside the load bed. Preferably, separate platforms are mounted along each of the respective longitudinal sides of the load bed, and also across the rear of the load bed, so that the platforms in their condition of use together substantially surround the load bed.

Desirably also, the or each platform has a balustrade to reduce the likelihood that an operator will fall from the platform in its in use condition.

Preferably, the balustrade is movable relative to the load bed, the balustrade having its own in use condition and stowed condition. In one embodiment the balustrade is carried by support posts which are pivotably mounted to the vehicle.

The support posts may be extendable, preferably telescopically, so that the height of the balustrade is adjustable.

In one embodiment the platform is substantially perpendicular to the surface of the load bed, and projects above the load bed, in its stowed condition (so that the platform lies alongside the load). The platform is movable to its in use condition, and also movable to an access condition, the platform in its access condition lying beneath the load bed and permitting substantially free access to the load bed by a fork lift truck or the like. In such embodiments the load bed can be used to carry elongate articles as above described, or can be used to carry palletised articles or the like for which the platform will usually not be required.

Preferably the balustrade is mounted upon at least one support beam, the support beam(s) being pivotably mounted and movable between a stowed condition and an in use condition. Preferably also the platform is pivotable relative to the load bed, and in its in use condition is supported by the support beam(s).

Desirably, the balustrade is mounted so as to be movable to an access condition, the balustrade being pivotably mounted to move between its stowed and access conditions. Desirably also the support beam(s) pivot about a first axis between is their stowed and in use conditions, and the balustrade pivots about a second axis between its stowed condition and its access condition. Desirably the first and second axes are substantially perpendicular, and preferably the first axis is substantially vertical and the second axis is substantially horizontal.

There is also provided a vehicle having a load bed and a platform, the load bed having a longitudinal axis and two longitudinal sides, the vehicle being adapted for transporting articles on the load bed, the load bed in use having a retaining structure along at least one of the longitudinal sides, the platform being mounted for movement between a stowed condition and an in use condition, at least part of the retaining structure being between the load bed and the platform when the platform is in its in use condition.

BRIEF DESCRIPTION OF THE PREFERRED EMBODIMENTS

The invention will now be described in more detail, by way of example, with reference to the accompanying schematic drawings, in which:

FIG. 11 shows a perspective view of a support beam for a balustrade of the fourth embodiment;

FIG. 12 shows a partial rear view of the load bed of the fourth embodiment, with the platform and balustrade in their access conditions;

FIG. 13 shows a side view of a vehicle incorporating a combination load bed and platform according to the present invention.

DETAILED DESCRIPTION

The vehicle in each of the embodiments of FIGS. 1-12 is a flat-bedded trailer adapted for connection to a tractor unit (not shown) in conventional fashion. The vehicle in the embodiment of FIG. 13 is a rigid vehicle.

Figure 1:
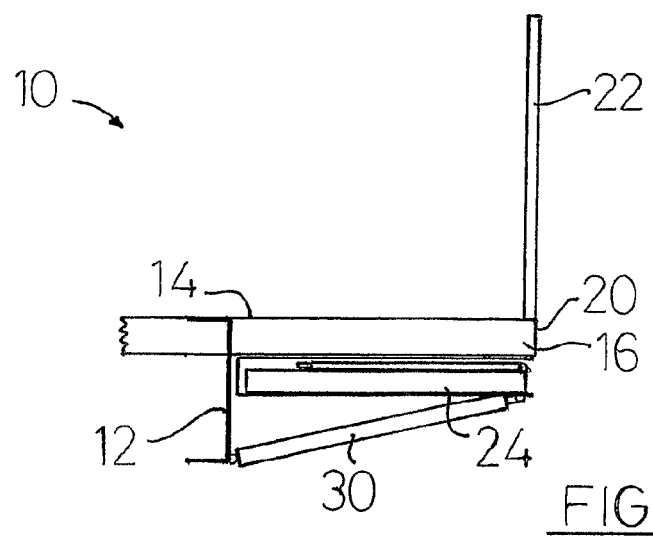
FIG. 1 shows a partial rear view of a vehicle incorporating a combination load bed and platform according to a first embodiment of the present invention, with the platform and balustrade in their stowed conditions.
Figure 2:
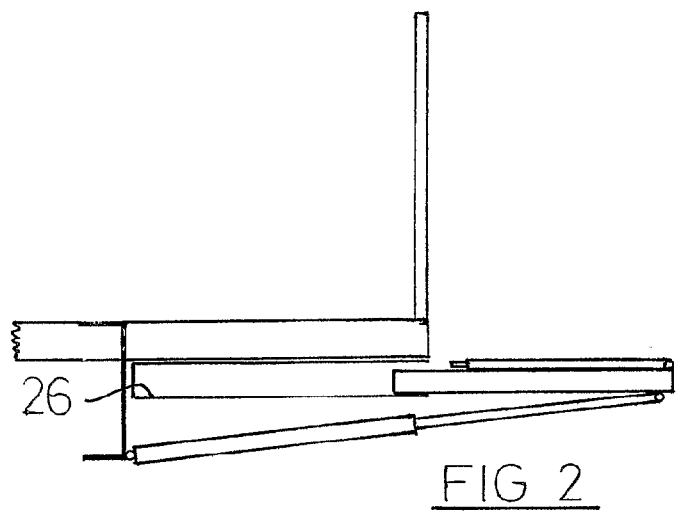
FIG. 2 shows a view as FIG. 1, but with the platform in its in use condition and with the balustrade in its stowed condition relative to the platform.
Figure 3:
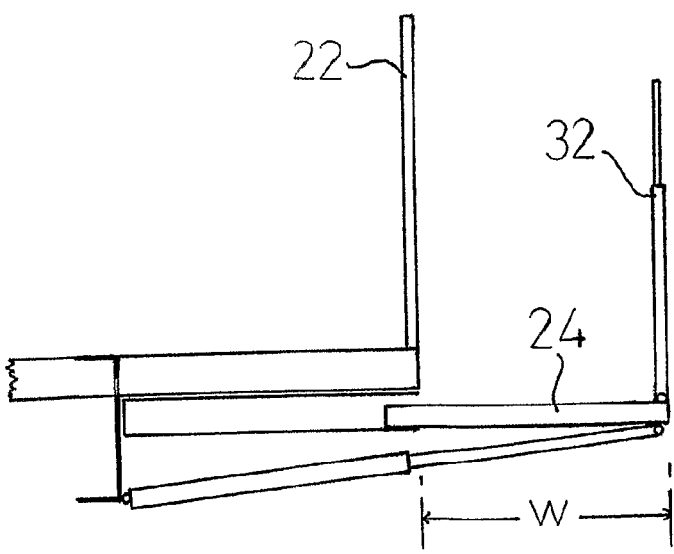
FIG. 3 shows a view as FIG. 1, but with the platform and balustrade in their in use conditions.

In the embodiment of FIGS. 1-3 the trailer 10 has a chassis comprising two chassis members 12 (only one of which is shown) which define the length of the trailer 10. Connected to the chassis members 12 are the road springs and axle(s), neither of which relate to the present invention and which are therefore not shown.

The chassis members 12 carry a load bed 14, which in typical fashion comprises a rigid metallic frame 16 within which are mounted timber planks. The load bed 14 therefore provides a substantially flat surface upon which the load (not shown) can be carried.

The present invention is primarily designed for loads comprising elongate articles, and in order to prevent the elongate articles from rolling or sliding off the side of the trailer one or both of the longitudinal sides 20 of the trailer (only one of which can be seen) have a retaining structure which in this embodiment comprises a number of retaining posts 22 mounted at selected intervals along the length of the load bed 14. In common with prior art trailers, the retaining posts 22 are removably located in pockets in the frame 16 which are provided at the predetermined intervals along the sides 20 of the load bed 14.

The above-described features of the trailer 10 are conventional and do not require further explanation. In addition, no explanation is necessary or provided for the other conventional componentry of the trailer 10 which plays no part in the present invention.

According to the present invention, the trailer 10 carries a platform 24 which has an in use condition (as shown in FIGS. 2 and 3) in which it lies alongside the load bed 14, with the retaining posts 22 between the load bed 14 and the platform 24, and a stowed condition (as shown in FIG. 1) in which it is stowed or stored upon the trailer whilst not increasing the width of the trailer significantly (or in this embodiment at all). Accordingly, in the stowed condition as shown in FIG. 1 the platform 24 lies within the width of the load bed 14, which is itself typically of a width corresponding to the maximum determined width for trailers on the public roads of the location of use. No special measures are therefore required for use of the trailer 10 on the public roads whilst the platform 24 is in its stowed condition.

In the condition of use, however, the width of the trailer 10 is increased by the platform 24, the platform 24 providing a place for an operator to stand whilst disconnecting or connecting lifting cables to the elongate articles carried by the trailer 10.

It will be understood that the operator will need to disconnect and connect lifting cables at predetermined points along (typically adjacent to each end of) the elongate articles, and so the platform 24 suitably runs substantially the full length of the load bed 14. Alternatively separate, independent, platforms are provided along the length of the load bed 14, the operator standing upon a chosen one of the platforms when it is desired to disconnect or connect lifting cables adjacent to that platform.

It will be appreciated that the load bed 14 is typically more than 1 meter above the ground, and therefore the platform 24 is also typically more than 1 meter above the ground. A ladder or series of steps (not shown) are therefore provided to enable the operator conveniently to climb onto the platform 24.

Though only one side of the trailer 10 is shown in FIGS. 1-3, it will be understood that a similar platform can be provided along the other longitudinal side of the trailer, to facilitate the disconnection and connection of lifting cables from both sides of the trailer. Alternatively, if a platform 24 is fitted to one side only of the trailer 10, then the operator may have to step onto the load bed 14 to disconnect or connect lifting cables to an elongate article at the other side of the load bed 14, but provided the operator retreats onto the platform 24 when the elongate article is being lifted by the crane, the operator will be protected from unexpected movements of the elongate articles by the retaining posts 22.

In the embodiment shown in FIGS. 1-3 in its stowed condition the platform 24 is located in a channel or tray 26 located underneath the load bed 14. Since the platform 24 runs substantially the full length of the load bed 14 it will be understood that the channel or tray 26 can also run substantially the full length of the load bed, or else several discrete channels or other support members can be located at chosen intervals along the trailer 10. In areas of the trailer where space underneath the load bed 14 is more limited, e.g. adjacent to the road wheels, the platform can be of reduced thickness, or the platform can be discontinuous.

Also, in the embodiment shown in FIGS. 1-3 the width w of the platform can be no greater than the distance between the chassis member 12 and the side 20 of the load bed 14. However, it is expected that the platform would need to be no more than around 60 cm wide, and could in many cases be around 45 cm wide, and there is believed to be more than enough space available to accommodate such platforms on most conventional trailers. If a purpose-built vehicle having a combination load bed and platform according to the invention was to be provided it could be ensured that the desired width of platform could be accommodated. Also, in a purpose-built vehicle the tray could be a recess in the load bed.

In the embodiment of FIGS. 1-3 the platform 24 is moved between its stowed and in use conditions by a number of pneumatic actuators 30 (only one of which is seen). Most trailers have compressed air supply lines to serve the brakes and other componentry, and the actuator 30 can also be served by those supply lines, or by its own independent compressed air supply. In alternative embodiments the platform is moved by one or more hydraulic actuators, electric motors, or by manual methods such as a rotary handle driving a pinion and rack for example.

In the embodiment shown, the actuator 30 serves both to move the platform 24 and also to support the platform in its in use condition. Additional support for the is platform could be provided by legs which can be extended (preferably telescopically) to reach the ground, by bars extending into guides underneath the load bed, or other suitable means (not shown).

In the embodiment of FIGS. 1-3 the platform has a balustrade in the form of one or more rails (not shown) mounted upon support posts 32 (there being a series of support posts 32 at selected intervals along the length of the load bed 14, only one of which posts can be seen in these end views). The support posts 32 are pivotably mounted upon the platform 24 and can pivot between a stowed condition as shown in FIG. 2 and an in use condition as shown in FIG. 3. The use of pivotable support posts enables the balustrade to lie within the channel or tray 26 when the platform is in the stowed condition, so that the platform 24 and balustrade can be substantially hidden from view when not in use, and importantly can lie within the overall width of the load bed 14, so that the width of the load bed is not increased.

The support posts 32 are telescopic, enabling the height of the rails of the balustrade above the platform to be greater than the width w of the platform 24. In particular, it is desired that the top rail of the balustrade be above waist height for an adult operator, and it is presently believed that the Health and Safety Executive in the UK require a balustrade rail to be at a height of around 1.2 meters. The use of extendable support posts also permits the height of the top rail to be adjustable if desired.

Though not shown in the figures, the support posts 32 can also mount a foot rail (often called a "toe plate") or the like close to the platform 24, the foot rail acting to reduce the likelihood that the operator's foot can slide or otherwise move inadvertently off the platform 24.

It will be understood that the platform 24 (or the set of separate platforms 24) provides a continuous or discontinuous footway for the operator alongside the load bed 14, which footway can be used by the operator when he or she is disconnecting lifting cables from elongate articles which have been lifted onto the trailer 10, and also when he or she is connecting lifting cables to elongate articles which are to be lifted off from the trailer 10. The platform 24 provides a safe area for the operator because the retaining posts 22 lie between the operator and the elongate articles as they are lifted over the load bed 14. In common with prior art trailers for elongate articles, the retaining posts can if desired be designed to project around 2 meters above the load bed 14 and so provide protection up to and beyond head height for most operators.

Figure 4:
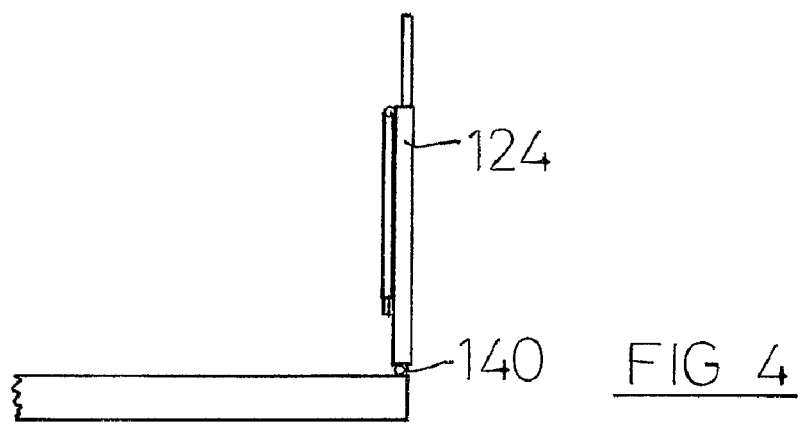
FIG. 4 shows a partial rear view of a combination load bed and platform according to a second embodiment of the present invention, with the platform and balustrade in their stowed conditions.
Figure 5:
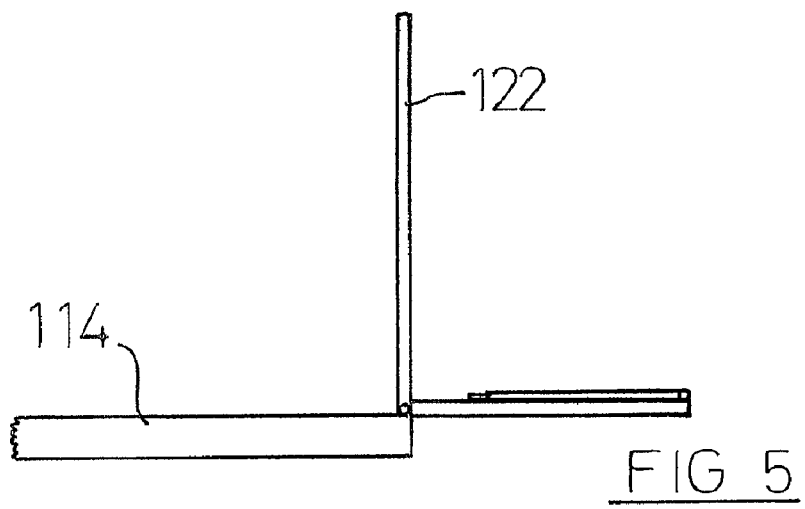
FIG. 5 shows a view as FIG. 4, but with the platform in its in use condition and with the balustrade in its stowed condition relative to the platform.
Figure 6:
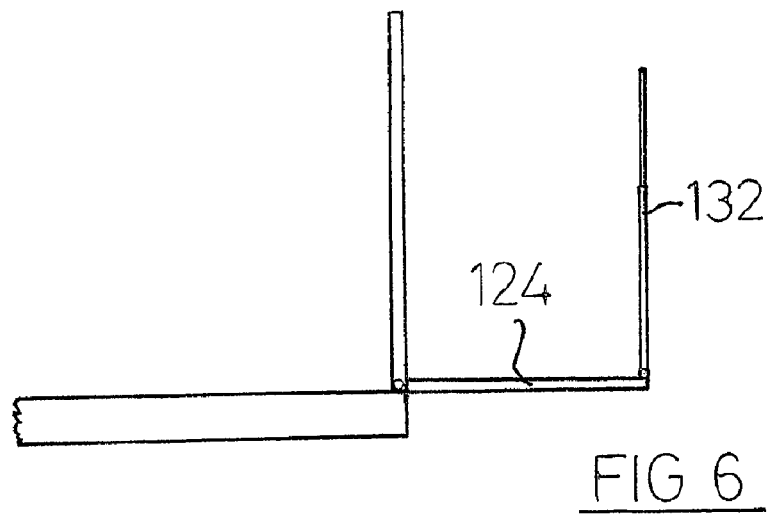
FIG. 6 shows a view as FIG. 4, but with the platform and balustrade in their in use conditions.

The second embodiment is shown in FIGS. 4-6. These figures show only the load bed, platform, and balustrade, but it will be understood that these parts can cooperate with the other parts of a vehicle in a similar way to those of the first embodiment. In this embodiment the platform 124 is pivotable relative to the load bed 114. As shown, the platform 124 may be pivoted downwardly from the stowed condition of FIG. 4 to an in use condition of FIGS. 5 and 6. The support posts 132 of the balustrade of this embodiment are pivotably mounted upon the platform 124, the support posts being pivotable between their stowed condition of FIG. 5 and their in use condition of FIG. 6.

In the embodiment of FIGS. 4-6, the platform 124 in its stowed condition lies alongside the retaining posts 122, so that the overall width of the trailer 110 is increased slightly. However, it is still arranged that the trailer width conforms to the local limit.

It is arranged that the hinge(s) 140 can rotate through substantially 90° only, so that the hinge(s) act to support the platform 124 in its in use condition. Alternatively or additionally, ground-engaging legs and/or other support means can be provided.

In other embodiments the platform could pivot downwardly from its in use condition to its stowed condition, though this is not preferred as the platform in its stowed condition would cover the road wheels and make changing a punctured tyre more difficult. Alternatively, in such an embodiment it could be arranged that is no platform is provided adjacent to the road wheels, i.e. separate platforms are provided in front of and behind the road wheels, which platforms could provide the access required to disconnect and connect the lifting cables. Such platforms in their stowed conditions could replace the crash bars which are located beneath most vehicle trailers to prevent other vehicles running underneath the trailer.

Figure 7:
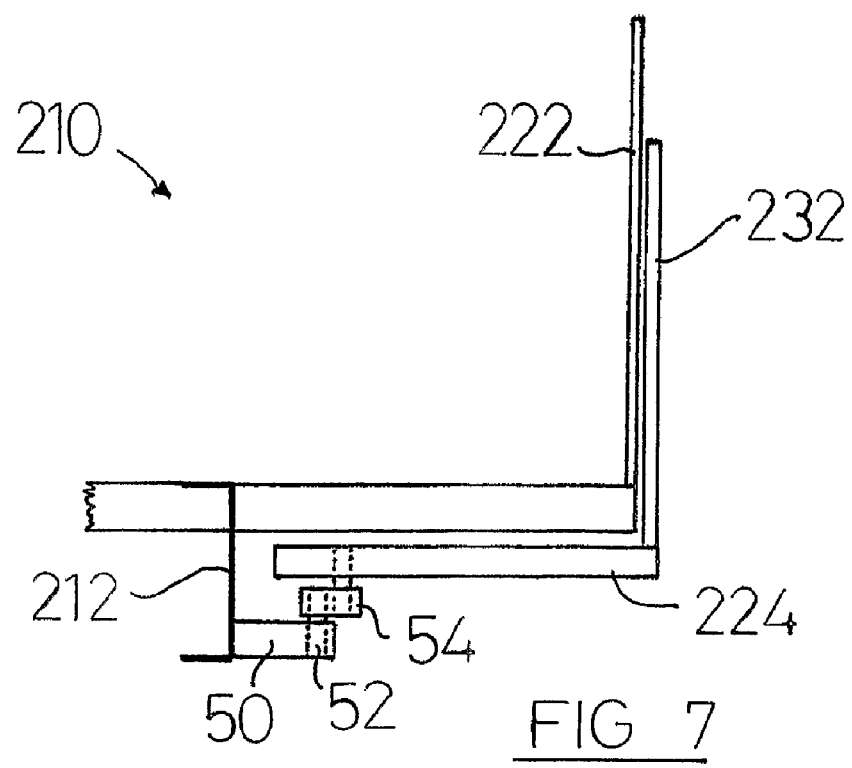
FIG. 7 shows a partial rear view of a vehicle incorporating a combination load bed and platform according to a third embodiment of the present invention, with the platform and balustrade in their stowed conditions.
Figure 8:
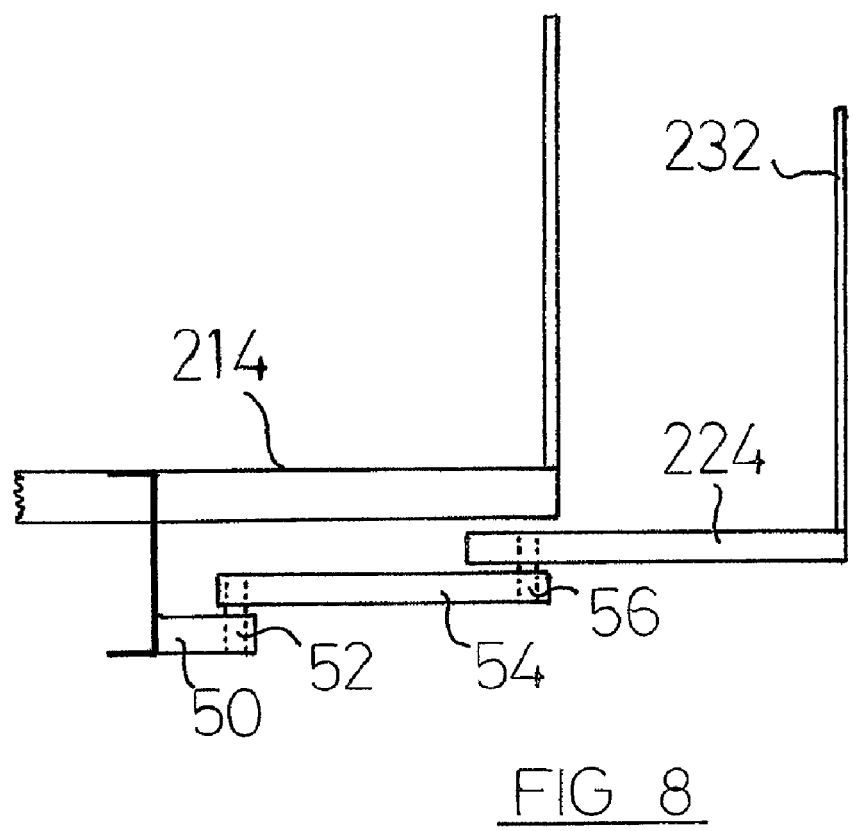
FIG. 8 shows a view as FIG. 7, but with the platform and balustrade in their in use conditions.

In the embodiment of FIGS. 7 and 8, a set of brackets 50 are mounted upon the chassis member 212 underneath the load bed 214, each bracket 50 mounting a substantially vertical pivot pin 52 which is connected to one end of a link 54. The other end of the link 54 carries another substantially vertical pivot pin 56 which is in turn connected to the platform 224. It will therefore be understood that the links 54 (only one of which can be seen) can be pivoted together between their stowed conditions shown in FIG. 7 in which the platform 224 is located substantially fully underneath the load bed 214, and their in use conditions shown in FIG. 8 in which the platform 224 extends beyond the load bed 214. In this embodiment, therefore, the platform 224 maintains a substantially horizontal orientation as it swings between its stowed and in use conditions.

In the embodiment of FIGS. 7 and 8 the support posts 232 (and therefore also the rails (not shown)) of the balustrade are fixed relative to the platform 224, and in the stowed condition of FIG. 7 the balustrade lies alongside the load bed 214. In this embodiment therefore the overall width of the trailer 210 is increased by the thickness of the balustrade at one or both sides of the trailer.

It will be understood that certain features of one embodiment can be interchanged with features of other embodiments, as appropriate. For example, the first embodiment could utilise a fixed balustrade as in the third embodiment, and the third embodiment could utilise a movable balustrade as in the first embodiment.

Figure 9:
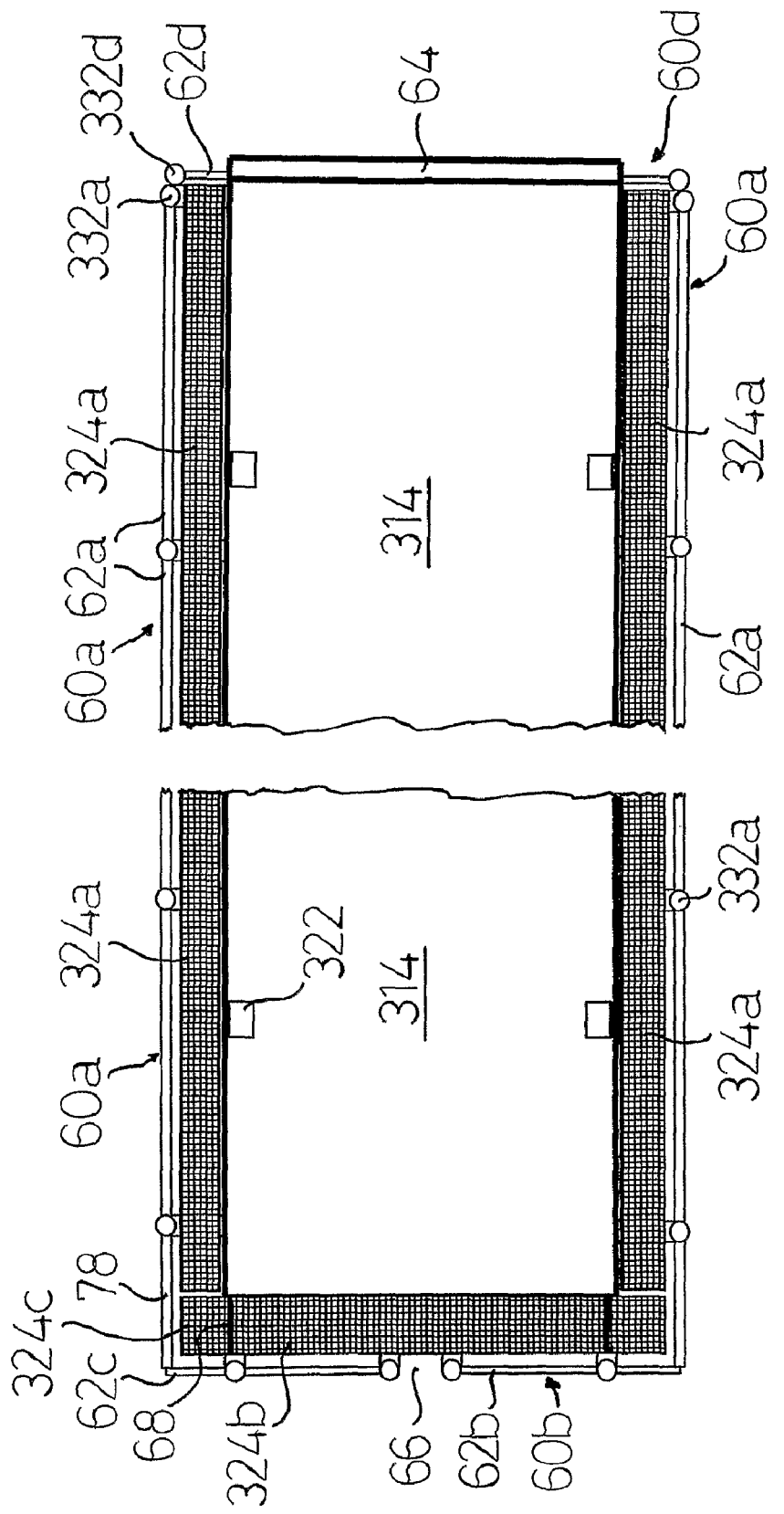
FIG. 9 shows a plan view of a vehicle incorporating a combination load bed and platform according to a fourth embodiment of the present invention, with several platforms and balustrades, all in their in use conditions.

The fourth embodiment is shown in FIGS. 9-12. FIG. 9 shows a plan view of a vehicle, in this embodiment also a trailer, having a load bed 314, and as seen in this embodiment separate platforms 324a, 324b are provided alongside each of the longitudinal sides of the load bed and alongside the rear end of the load bed respectively, so that the platforms together substantially surround the three open sides of the load bed 314.

In common with other embodiments the platforms 324a can be continuous or discontinuous. In this embodiment there are two separate platforms 324a alongside each of the longitudinal sides, so as to facilitate ease of handling of the platforms.

Figure 10:
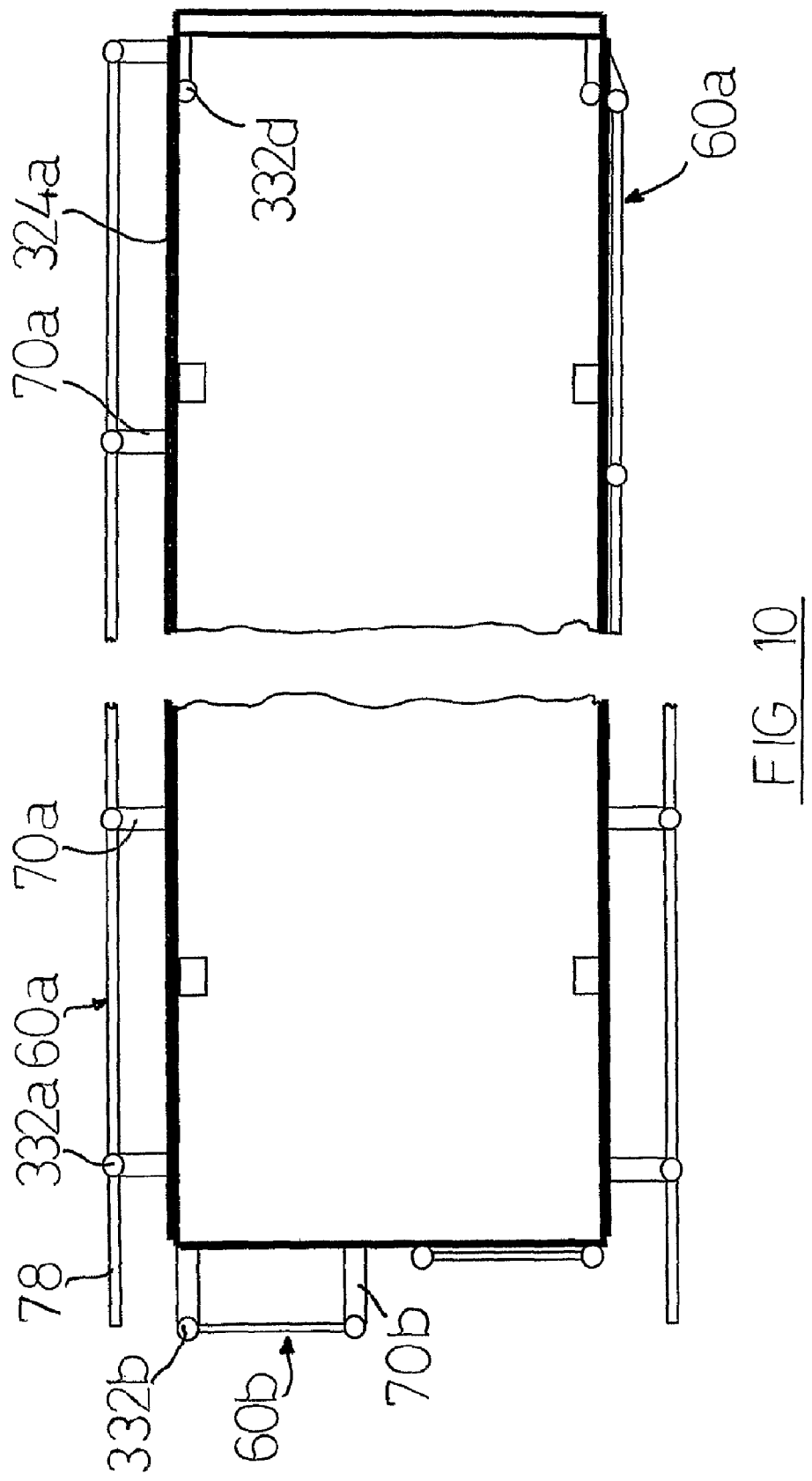
FIG. 10 shows a view as FIG. 9 but with the platforms in their stowed conditions and some of the balustrades in their in use condition and others in their stowed condition.

In this embodiment the platforms 324a in their stowed conditions project above the surface of the load bed 314, i.e. the platforms 324a pivot upwardly from their in use condition shown in FIG. 9 to their stowed condition shown in FIG. 10, in a similar fashion to the second embodiment shown in FIGS. 4-6. Usefully, the platforms can be secured to the retaining posts 322 in their stowed condition.

The balustrades 60a for the platforms 324a comprise rails 62a which are mounted between respective support posts 332a. The rails 62a are of a combined length substantially to match the length of a platform 324a, so that a separate balustrade is provided for each of the separate platforms 324a. Typically, the balustrades 60a comprise a top rail 62a around 1.2 m above the platform 324a, and a bottom rail around 0.6 m above the platform 324a (only the top rail can be seen in the plan views of FIGS. 9 and 10). A foot rail or toe plate may be carried by the platform 324a or the support posts 332a if desired.

In this embodiment in which the load bed is substantially surrounded by platforms and balustrades, there is a pair of additional front balustrades 60d, each comprising rails 62d and support post 332d, which balustrades are pivotably mounted to the front wall 64 of the trailer. The front balustrades 60d can pivot between their in use condition shown in FIG. 9 (in which they close off the front end of the front platform 324a) and their stowed conditions as shown in FIG. 10.

Also, two rear balustrades 60b are provided, each comprising rails 62b and support posts 332b. The rear balustrades 60b are separated to permit access is through the opening 66 to the platforms by way of a ladder or the like (not shown). The rear balustrades 60b carry extension rails 62c which can preferably slide into or between the rails 62b.

It will be seen from FIG. 10 that the side balustrades 60a are mounted upon respective support beams 70a, whilst the rear balustrades 60b are mounted upon support beams 70b. The support beams 70a, 70b support the platforms 324a and 324b respectively when the platforms have been pivoted into their in use conditions.

A support beam 70a is shown in FIG. 11. Each support beam 70a is mounted upon a respective pivot pin 72 which is located in a housing 74, the housing 74 being rigidly secured either to a chassis member, to the side of the load bed 314, or to some other part of the vehicle. Accordingly, the support beams 70a can be pivoted upon their respective pivot pins 72 between their stowed conditions and their in use conditions. It will be understood from FIG. 10 in particular that each balustrade 60a has at least two support beams 70a, and preferably has three or four support beams 70a, all of the support beams being linked to pivot together by the rails 62a of the balustrade 60a.

The support beams 70b, however, are mounted to slide into and out of respective recesses in the load bed 314, i.e. the support beams 70b do not pivot relative to the load bed.

To fill in the gap which would otherwise be present between the rearmost side platform 324a and the rear platform 324b two corner platform sections 324c are provided. Each corner platform 324c is mounted to a platform 324b by a respective hinge 68. The corner section 324c must be folded over the outer part of the respective platform 324b before the platform 324b can be pivoted upwardly to its stowed condition. The hinges 68 ensure that the corner section 324c in its in use condition remains substantially horizontal, so that separate support for the corner sections is not required (but could otherwise be provided if desired).

FIG. 10 shows the condition in which the front balustrades 60d have been moved to their stowed conditions, in which the rails 62c have been stowed alongside (or within) the rails 62b, and all of the platforms 324a and 324b have been pivoted to their stowed conditions. In addition, and in order to better explain the stowage of the balustrades, one of the balustrades 60a has been pivoted to its stowed condition, and one of the balustrades 60b has been slid to its stowed condition. It will be understood that the other balustrades 60a, 60b can be stowed in a similar manner, and can subsequently be secured in their stowed conditions (suitably the balustrades 60a are secured to the retaining posts 322 and the balustrades 60b are secured to the balustrades 60a).

The rearmost rails 78 of the rearmost side balustrades 60a project beyond the rearmost support post 332a, and can be connected to the rails 62c in the in use condition of FIG. 9. The rails 78 are mounted to pivot upon the support post 332a and in their stowed conditions lie alongside the stowed balustrades 60b at the rear of the load bed 314.

It will therefore be understood that when the platforms 324 and balustrades 60 have been stowed they lie alongside a load being carried upon the load bed 314, similar to the second embodiment of FIGS. 4-6, and as shown specifically in FIG. 4.

Similar to that embodiment the stowed platforms 324 and balustrades 60 project slightly beyond the load bed 314, and it is arranged that the total width of the load bed and stowed platforms and balustrades meets the local vehicle width limit.

Such a stowed condition will be acceptable during transportation of the load, during which access to the load bed 314 is not required. However, it may sometimes be required to gain access to the load bed 314 without using the platforms, for example at least part of the load may be palletised and require access by a fork lift truck.

In the present invention, therefore, the platforms 324a and balustrades 60a have an additional access condition, in which they can be lowered relative to the load bed 314. The detailed construction of one embodiment of the support beams 70a and the platforms 324a which makes this possible are shown in FIGS. 11 and 12.

As above indicated, the support beam 70a is mounted upon a pivot pin 72 which defines a first pivot axis, the first pivot axis being preferably vertical. The support post 332a is connected (by way of the rails 62a) to one or more other similar support posts 332a each mounted upon a similar support beam 70a, and so is necessarily mounted to pivot upon a pivot pin 76 having a pivot axis parallel to the pivot axis of the pivot pin 72.

In addition, the support post 332a is mounted upon a boss 80 which can pivot about a pivot pin 82 carried by the support beam 70a. It is arranged that when the balustrade 60a is in its stowed condition the pivot pin 82 of each of the support beams 70a of that balustrade are parallel, so that the support posts 332a can be pivoted together about a second pivot axis defined by the pivot pins 82. It is furthermore arranged that the axis of the pivot pins 82 is substantially parallel to the longitudinal side of the load bed 314, so that the rails 62a and support posts 332a can pivot from a position above the load bed 314 (shown in dotted outline in FIG. 12) to a position below the load bed (shown in solid lines in FIG. 12).

Also, as shown in FIG. 12 the platform 324a is mounted upon two parallel hinges 84 and 86, separated by spacer 90. During movement of the platform 324a between its stowed and in use conditions only the first hinge 84 is utilised and the spacer 90 remains substantially parallel with (and forms an extension of) the platform 324a—as shown in dotted outline in the stowed condition in FIG. 12. The second hinge 86 and spacer 90 are required to move the platform 324a to the access condition shown in solid lines in FIG. 12, and specifically so that the platform 324a can clear the support beams 70a.

Both of the hinges 84 and 86 are fitted with lugs (not shown) which limit the hinge's rotation to substantially 90°. It will be understood that as the platform 324a is pivoted (clockwise) from the access condition shown in FIG. 12 the hinge 86 will only permit rotation until the platform 324a is substantially parallel with the spacer 90 (and the platform 324a is in its in use condition). Continued pivoting movement will be by way of the hinge 84 which permits the further necessary rotation for the platform 324a to reach its stowed condition shown in dotted outline.

In common with prior art load beds, the retaining posts 322 are removable from the load bed (and may also if desired be sectional so that the height of the retaining posts can be changed to suit the load). If it is desired to use the load bed for transporting palletised articles or the like which are loaded by fork lift truck, the retaining posts can be removed and the platforms 324a and balustrades 60a moved between their access condition for loading and unloading, and their stowed conditions during transportation.

FIG. 13 shows a fifth embodiment of the invention, in which the vehicle is a rigid-bodied vehicle 400. The load bed 414 is mounted onto the chassis members 412 of the vehicle 400, in known fashion. FIG. 13 shows the platform 424 and balustrade in their in use conditions, so that only the edge of the platform 424 is visible. The support members for the platform are not shown, but it will be understood that the platform 424 could be supported by any of the components described in relation to the other embodiments, and could be moved to its stowed condition (and access condition, if appropriate) by any of the means described.

The balustrade comprises a set of support posts 432 and a pair of rails 62. In this embodiment a platform is not provided along the rear end of the load bed 414, but such a platform could be provided if desired. The load is retained by a set of retaining posts 422 in known fashion.

It will be understood that there are many different embodiments available to a particular designer, the actual embodiment being chosen to suit the design of vehicle and the elongate articles being transported. Some embodiments will be suitable for retro-fitment to an existing vehicle, but it is expected that in most cases the invention would be designed into the structure of a new vehicle (i.e. a new trailer or rigid-bodied vehicle). If the latter, then details such as the fact that the platform shown in FIG. 12 is secured to the top of the load bed 314 could be avoided if desired.

In the stowed condition all of the embodiments would take advantage of the space available either underneath the load bed or alongside the load to store the platform in a position in which the width of the trailer is increased by only a small amount, if at all.

The invention claimed is:

1. A combination load bed and platform for a vehicle adapted to transport articles on the load bed, the load bed being substantially flat and having a longitudinal axis and two longitudinal sides, the load bed in use having a retaining structure along at least one of the longitudinal sides, the platform being mounted upon the vehicle for movement between a stowed condition and an in use condition, at least part of the retaining structure being between the load bed and the platform when the platform is in its in use condition, the platform in its in use condition being at substantially the same height as the load bed, the platform having a balustrade, in which the balustrade is movable relative to the load bed independently of movement of the platform, in which the balustrade is carried by at least one support beam which is pivotably mounted upon the vehicle, and in which the platform in its in use condition is supported by the at least one support beam.

2. A load bed according to claim 1 in which the load bed also has a rear end, and in which a further platform is mounted along the rear end, so that the platforms in their in use condition together substantially surround the load bed.

3. A combination load bed and platform for a vehicle, the load bed having a longitudinal axis and two longitudinal sides, the vehicle being adapted for transporting articles on the load bed, the load bed in use having a retaining structure along at least one of the longitudinal sides, the platform being mounted upon the vehicle for movement between a stowed condition and an in use condition, at least part of the retaining structure being between the load bed and the platform when the platform is in its in use condition, in which the platform projects above the load bed in its stowed condition, and in which the platform is movable also to an access condition below the load bed.

4. A load bed according to claim 3 in which the balustrade is carried by at least one support beam, the balustrade also having stowed, in use and access conditions, and in which the balustrade is mounted to pivot between its stowed and access conditions.

5. A load bed according to claim 4 in which the support beam pivots about a first axis between the stowed and in use conditions, and the balustrade pivots about a second axis between the stowed condition and the access condition.

6. A load bed according to claim 5 in which the first and second axes are substantially perpendicular.

7. A load bed according to claim 3 in which the load bed also has a rear end, and in which a further platform is mounted along the rear end, so that the platforms in their in use condition together substantially surround the load bed.

8. A load bed according to claim 3 in which the balustrade is movable relative to the load bed independently of movement of the platform.

9. A load bed according to claim 8 in which the balustrade is carried by at least one support beam which is pivotably mounted upon the vehicle.

* * * * *